United States Patent [19]

Voss

[11] Patent Number: 5,050,764
[45] Date of Patent: Sep. 24, 1991

[54] LATERAL COMPRESSION SEALING SYSTEM AND METHOD OF MAKING SEAL

[75] Inventor: Laveille K. Voss, Altadena, Calif.

[73] Assignee: Pacesetter Infusion, Ltd., Sylmar, Calif.

[21] Appl. No.: 490,219

[22] Filed: Mar. 8, 1990

[51] Int. Cl.⁵ ............................................. B65D 53/00
[52] U.S. Cl. .................................... 220/378; 220/327;
220/4.21; 220/357; 277/180; 277/181; 277/189;
277/205
[58] Field of Search ................ 220/378, 357, 358, 324,
220/327, 4.21; 277/205, 180, 181, 189

[56] References Cited

U.S. PATENT DOCUMENTS

| 1,583,126 | 5/1926 | Crane | 277/168 |
|---|---|---|---|
| 2,200,151 | 5/1940 | Burkhardt | 277/168 |
| 2,462,596 | 2/1949 | Bent | 277/168 |
| 2,553,222 | 5/1951 | Wallgren et al. | 277/168 |
| 2,566,777 | 9/1951 | Schmidt | 220/81 R |
| 2,770,510 | 11/1956 | Collins | 277/171 |
| 2,818,287 | 12/1957 | Josephson | 286/26 |
| 3,166,332 | 1/1965 | Olson | 277/171 |
| 3,233,907 | 2/1966 | Stanton | 277/168 |
| 3,353,832 | 11/1967 | Coulson | 277/171 |
| 3,567,258 | 3/1971 | Scaramucci | 285/334.4 |
| 4,045,037 | 8/1977 | Pippert | 277/205 |
| 4,165,882 | 8/1979 | Crow | 277/168 |
| 4,192,520 | 3/1980 | Hasegawa | 277/235 B |
| 4,193,604 | 3/1980 | Sarvanne | 277/117 |
| 4,206,499 | 6/1980 | Urbanek et al. | 362/80 |
| 4,304,415 | 12/1981 | Wolf et al. | 277/205 |
| 4,398,731 | 8/1983 | Gorman et al. | 277/124 |
| 4,434,891 | 3/1984 | Skinner et al. | 220/378 |
| 4,501,432 | 2/1985 | Kuniyoshi et al. | 277/168 |

Primary Examiner—Stephen Marcus
Assistant Examiner—Stephen K. Cronin
Attorney, Agent, or Firm—Leslie S. Miller; Mark F. Harrington

[57] ABSTRACT

A system for sealing a case with a lid and method of forming a seal generally comprises a raised edge on the case, a shaped channel in the lid and a cross-sectionally shaped gasket that is laterally compressed by the side walls of the channel and seals the lid and case between the side walls of the channel and the case raised edge.

19 Claims, 1 Drawing Sheet

LATERAL COMPRESSION SEALING SYSTEM AND METHOD OF MAKING SEAL

BACKGROUND OF THE INVENTION

1. Field of the Invention

The present invention relates generally to compression seals, and more particularly to an improved lateral compression seal and a method of making a lateral compression seal.

Various different types of seals are known in the art. Some of these different types of seals can be found in the following U.S. Patents: U.S. Pat. No. 1,583,126, to Crane; U.S. Pat. No. 2,200,151, to Burkhardt; U.S. Pat. No. 2,462,596, to Bent; U.S. Pat. No. 2,553,222, to Wallgren et al.; U.S. Pat. No. 2,770,510, to Collins; U.S. Pat. No. 3,233,907, to Stanton; U.S. Pat. No. 3,353,832, to Coulson; U.S. Pat. No. 3,567,258, to Scaramucci; U.S. Pat. No. 4,165,882, to Crow; U.S. Pat. No. 4,192,520, to Hasegawa; U.S. Pat. No. 4,193,604, to Sarvanne; and U.S. Pat. No. 4,501,432, to Kuniyoshi et al. Compression seals typically use a gasket or O-ring sandwiched between two members and compressed in the same direction as the joining of the two members. The two members must be continually held against one another with the gasket sandwiched therebetween in order to keep the gasket deformed and in sealing engagement with the members.

A problem exists with compression seals in the prior art in that even forces must be applied along the entire length of the gasket in order to provide an effective sealing system. However, the deformed gasket tries to push the members apart. This requires numerous hold down fasteners, such as screws, along the entire length of the gasket and at a limited spacing from each other otherwise sealing can be or become uneven due to the gasket trying to resume its natural shape, resulting in an inconsistent seal.

It is therefore an objective of the present invention to overcome the problems in the prior art as well as to provide additional features and advantages.

SUMMARY OF THE INVENTION

The foregoing problems are overcome and other advantages are provided by a lateral compression sealing system which laterally compresses a gasket, and by a method of making a seal.

In accordance with one embodiment of the present invention, a housing assembly is provided comprising a first housing, a second housing, and a gasket. The first housing has a projecting seal receiving portion comprised of a raised portion of the first housing. The second housing has a recessed seal receiving portion with generally sloped sides. The gasket has a receiving slot and generally sloped sides.

The gasket is mounted on the first housing with the projecting portion of the first housing extending into the gasket slot, and the second housing is connected to the first housing with the gasket and the projecting portion of the first housing being received in the recessed portion of the second housing, wherein the recessed portion of the second housing has sloped sides which laterally compress the gasket therebetween and seal the first housing with the second housing.

In accordance with another embodiment of the present invention a system for sealing a first member with a second member is provided comprising a gasket, means for mounting the gasket to the first member, and means for forming a seal between the first member and the second member. The gasket has a slot extending thereinto and two generally sloped sides. The means for mounting generally comprises a ridge projection extending along a surface of the first member. The projection is suitably sized and shaped to be received in the gasket slot.

The means for forming a seal between the first and second members comprises a cavity extending along a surface of the second member, the cavity having tapered side walls. The cavity receives the gasket and the projection therein and laterally compresses the gasket along its entire length between the side walls to form a seal between the side walls and the projection.

In accordance with one method of the present invention a method of forming a seal between a first housing and a second housing is provided comprising the steps of providing a gasket with a slot extending into a bottom thereof; mounting the gasket on a first housing, the first housing have a projecting edge portion wherein the projecting edge portion is received in the gasket slot; and mounting the second housing to the first housing with the gasket at least partially therebetween, the second housing having a channel with sloped side walls such that the gasket and the projecting edge portion extend into the channel with the sloped side walls laterally wedging the gasket therebetween to seal the second housing with the first housing projecting edge portion.

BRIEF DESCRIPTION OF THE DRAWINGS

These and other advantages of the present invention are best understood with reference to the drawings, in which.

DETAILED DESCRIPTION OF THE PREFERRED EMBODIMENT

Figure 1:
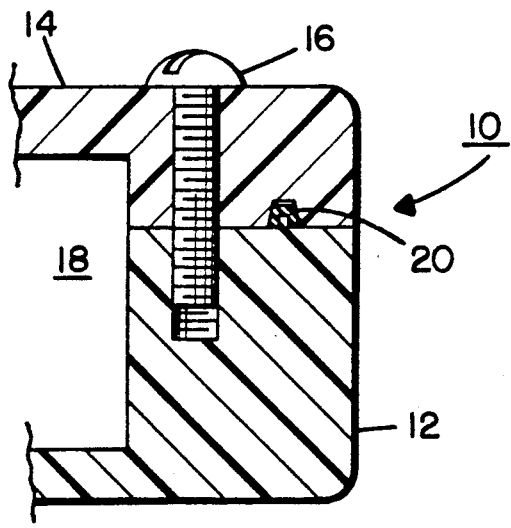
FIG. 1 is a partial cross-sectional view of a housing incorporating the sealing system of the present invention.

Referring to FIG. 1, there is shown a partial cross-sectional view of a housing 10 incorporating features of the present invention. The housing 10 is merely shown as a representational device in which the sealing system of the present invention may be used. It should be understood that the present invention may be used in any suitable type of sealing environment and in any suitable type of machine or apparatus requiring a seal. It should also be understood that the present invention may be practiced with any suitable size, shape, or type of elements, as will be evident from the following description.

The housing 10, in the embodiment shown, generally comprises a lower housing member or case 12 and an upper housing member or lid 14. When assembled, as shown in FIG. 1, the case 12 and lid 14 form a sealed chamber 18 in which a mechanism (not shown) can be located to protect it. It should be understood that the case 12 or lid 14 may also be comprised of a plurality of members and need not be single members. In the embodiment shown, screws 16 are provided to fixedly mount the lid 14 to the case 12 and are placed at various locations in the housing, such as its corners.

In the embodiment shown, surrounding the chamber 18 and between portions of the case 12 and the lid 14 is a resilient deformable gasket 20 which prevents fluid (including air) or the like from entering the housing 10 at the junction of the case 12 and the lid 14, thus protecting the mechanism (not shown) in the chamber 18 from damage. In alternate embodiments the housing 10 may have multiple gaskets in parallel and/or series arrangements. In addition, the gasket 20 need not be made of a resilient material. Any suitable type of material used for seals may be used in the gasket.

Figure 2:
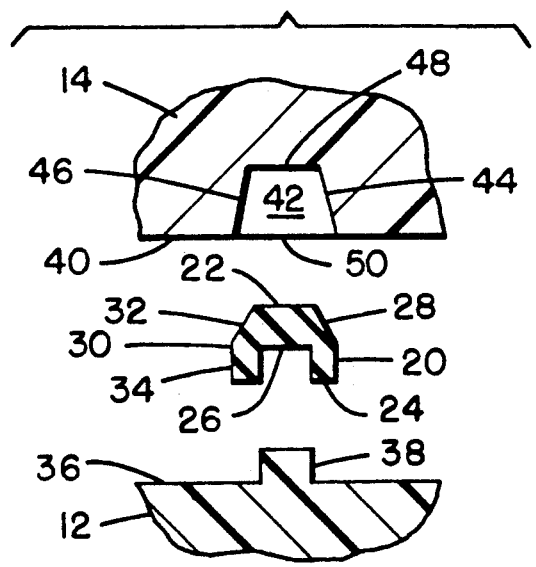
FIG. 2 is an enlarged exploded view of the sealing system used in the housing shown in FIG. 1.

Referring also to FIG. 2, an enlarged exploded cross-sectional view of the gasket 20 and the surrounding case 12 and lid 14 is shown. The gasket 20 is generally comprised of a suitable material such as silicone and has a general closed loop profile for surrounding the chamber 18. The cross sectional shape of the gasket 20 in its non-deformed shape, in the embodiment shown, generally comprises a relatively flat top 22, a bottom 24 having a slot 26 therein, and two sides 28 and 30 each having a lower relatively vertical portion 34 and an upper relatively sloped portion 32.

As shown, the sloped portions 32 of the two sides 28 and 30 taper in towards each other until they come to the relatively flat top 22. The change in pitch of the sloped portions 32 into the vertical portions 34 occurs at substantially the same location or height of the gasket 20 as the innermost section of the slot 26. The case or lower housing 12 generally has a relatively flat top surface 36 with a raised edge projection 38 that surrounds the chamber 18 The slot 26 in the gasket 20 is suitably sized and shaped to be mounted on the raised edge projection 38 with the projection 38 being received in the slot 26.

In a preferred embodiment of the present invention the slot 26 extends into the gasket at a depth of about one-third to two-thirds the height of the gasket 20. In the embodiment shown, the depth of the slot is about one-half the height of the gasket 20. However, any suitable depth of slot may be used. Thus, because the raised edge projection 38 is about the same size and shape of the slot 26, the projection will extend into the gasket 20 at about one-third to about two-thirds the height of the gasket 20, or whatever the depth of the slot is. In the embodiment shown, the raised edge projection 38 can extend into the gasket at about one-half the height of the gasket (see FIG. 4).

The lid 14 generally comprises a relatively flat bottom surface 40 having a recess or channel 42 which substantially surrounds the chamber 18. The channel 42 generally comprises tapered or sloped side walls 44 and 46 and a relatively flat top wall 48. In the embodiment shown, the tapered side walls 40 and 46 have a pitch of about 5° to about 15°. Also in the embodiment shown, the gasket 20 has a pitch of about 25° at its sloped portions 32. In an alternate embodiment of the invention the lid 14 may have a raised edge and the case 12 may have a channel.

Figure 6:
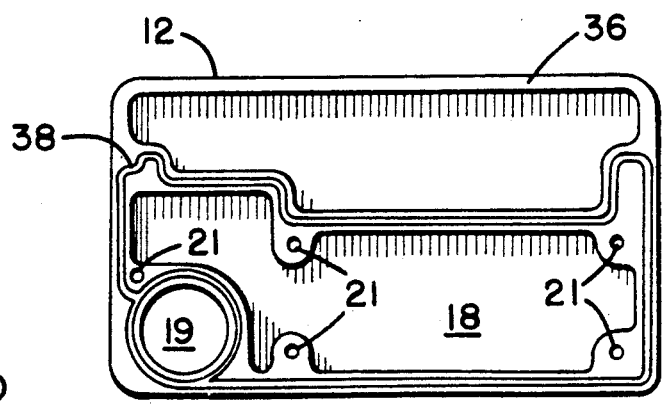
FIG. 6 is a plan top view of a case incorporating features of the present invention.

Referring also to FIG. 6, a plan top view of one type of case 12 is shown. In the embodiment shown, the raised edge projection 38 extends around two apertures 18 and 19 that form chambers when a lid is attached. The gasket 20 could thus be provided as a mirror image profile to the raised edge projection 38 with two loops. In the embodiment shown the case 12 has only five screw holes 21 at relatively large or long spaced distances from each other due to the unique sealing features of the present invention as will be further described below.

Figure 3:
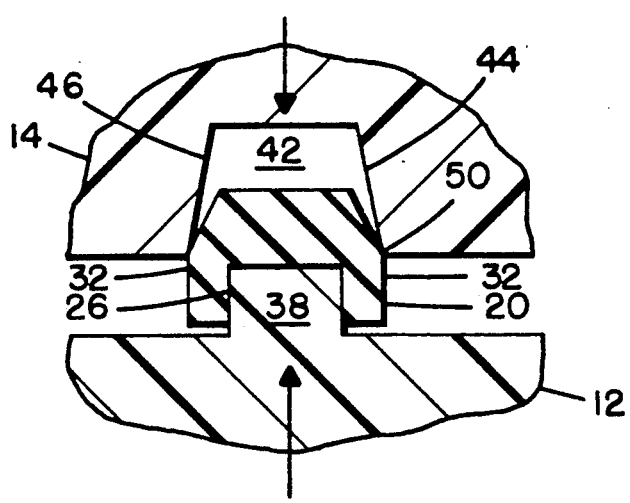
FIG. 3 is a cross-sectional view of the sealing system shown in FIG. 2 during assembly.

Referring now also to FIG. 3, the sealing system of the present invention is shown being assembled. In the embodiment shown, before connecting the lid 14 to the case 12, the gasket 20 is first mounted to the case 12 by means of the raised edge projection 38 and slot 26. As shown, the gasket 20 is mounted on the raised edge projection 38 with its slot 26 receiving the raised edge projection 38. After assembly of the gasket 20 to the case 12, the lid 14 and case 12 are then pressed together as shown by the arrows in FIG. 3 in a relatively vertical direction. As shown, the mouth 50 of the channel 42 is substantially the same width as the width of the gasket 20 between its two side vertical portions 32.

Figure 4:
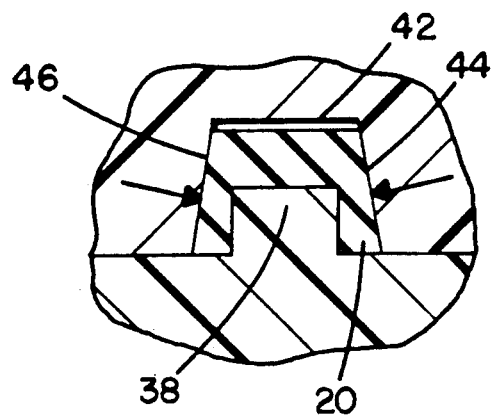
FIG. 4 is a cross-sectional view of the sealing system shown in FIG. 2 in its final assembled position.

Referring now also to FIG. 4, wherein an enlarged view of the assembled sealing system is shown, as the case 12 and lid 14 are pressed together with the gasket 20 therebetween, the tapered sides 44 and 46 of the channel 42 act as wedges against the sides 28 and 30 of the gasket 20 to compress the sides 28 and 30 towards each other. Because the tapered sides of the channel 42 are relatively shallow, such as between about 5° to about 15°, in the embodiment shown, the resultant forces applied by the side walls 44 and 46 against the gasket 20 are normal to the side walls 44 and 46.

Thus, although the case 12 and lid 14 are being pressed together in a relatively vertical direction the forces acting upon the gasket 20 are substantially directed in lateral directions as shown by the arrows in FIG. 4 to laterally compress the gasket 20 with a relatively small vertical compression. In the embodiment shown, the presence of the raised edge projection 38 inside the slot 26 of the gasket 20 allows this lateral compression of the gasket 20 to be used to provide the seal between the case 12 and lid 14 with the gasket being compressed between the side walls 44 and 46 of the channel 42 and the projecting edge 38.

Comparing FIG. 3 and FIG. 4, the purpose of the sloped top side portions 32 of the gasket 20 becomes clear. As seen in FIG. 4, in the embodiment shown, as the lid presses against the gasket 20 it deforms substantially the entire height of gasket sides 28 and 30 except at the top 22 and bottom 24. Due to the funnel shape of the channel 42, if the upper portion of the sides of the gasket were not sloped, instead of the compression forces of the gasket 20 acting primarily between the sides of the raised edge portion 38, they would act on the top of the raised edge portion 38 resulting in the gasket attempting to push the lid and case apart. Thus, the sloped side portions 32 are provided to prevent the degree of compression of the gasket 20 above the top of the raised edge 38 from being sufficiently large to push the case 12 and lid 14 apart.

By the use of the present invention, a reduced number of hold down fasteners or screws can be used between the case 12 and lid 14 while still providing an effective even seal therebetween. The present invention can also allow for relatively small 90° turns in the gasket 20 along its length as opposed to relatively large curves such as those that are needed for use of O-rings. The present invention is generally capable of sealing or forming a seal without a substantial closing force between the lid 14 and case 12, and the fasteners or screws 16 that are used with the housing 10 are used primarily to hold the upper and lower housings together and not primarily to enable a seal.

The present invention also allows for relatively easy access to the chamber 18 by removing the lid 14 without a complicated and time consuming procedure for reconnection of the lid and resealing of the gasket 20. Because the sealing force is exerted by the lid side walls 44 and 46 and raised edge portion 38 and the forces are substantially lateral rather than vertical, the gasket does not push the lid away from the case to the same degree as with prior art seals and sealing systems. It is also possible to prevent the gasket from any pushing apart of the lid and case if sufficient friction is present. The use of the raised edge projection 38 and the slot 26 in the gasket 20 also provides the feature of easier manufacturing by aiding in the fixing or assembling of the gasket 20 to the case 12 prior to the lid 14 being connected thereto.

Figure 5:
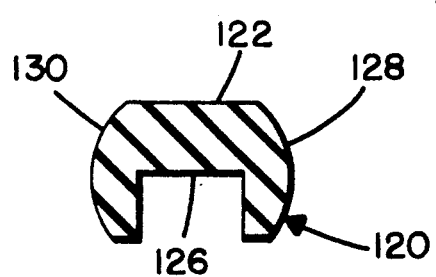
FIG. 5 is a cross-sectional view of a gasket having curved side walls for use with the present invention.

Referring to FIG. 5, a cross-sectional view of a gasket of an alternate embodiment of the invention is shown. In the embodiment shown, the gasket 120 has a flat top 122 and a bottom with a slot 126 therein. However, unlike the gasket 20 shown in FIGS. 1-4 the gasket 120 shown in FIG. 5 has relatively curved side walls 128 and 130 for further reducing vertical compression forces between the case 12 and lid 14.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A housing assembly comprising:
   a first housing member defining a case having a chamber therein, said first housing member having a projecting seal receiving portion comprising a raised portion of said first housing member;
   a second housing member defining a lid for said case, said second housing member having a recessed seal receiving portion, said recessed portion having generally sloped sides; and
   a gasket having a receiving slot and at least partially sloped sides, said gasket being mounted on said first housing member with said projecting portion extending into said slot and, said second housing member being connected to said first housing member with said gasket and said projecting portion being received in said recessed portion wherein said recessed portion sloped sides laterally compress said gasket therebetween and seal said first housing member with said second housing member, and wherein said gasket is a closed loop for forming a sealed chamber in said case and said lid.

2. An assembly as defined in claim 1 wherein said first housing member raised portion is comprised of a substantially box shaped raised edge.

3. An assembly as defined in claim 1 wherein said slot and said raised portion are substantially the same size.

4. An assembly as defined in claim 1 wherein said gasket sides have compound pitch slopes at a non-deformed position.

5. An assembly as defined in claim 4 wherein said gasket side slopes change pitch on said gasket sides at about the same location as the top of the receiving slot.

6. An assembly as defined in claim 1 wherein said gasket sides are convexly curved.

7. An assembly as defined in claim 1 wherein said recessed portion sloped sides have a pitch of about 5 to 15 degrees.

8. An assembly as defined in claim 1 wherein said gasket sloped sides have a first portion with a slope of about 25 degrees and a second portion that is substantially vertical.

9. A housing assembly comprising:
   a first housing with a projecting seal receiving portion comprising a raised portion of said first housing;
   a second housing with a recessed seal receiving portion, said recessed portion having generally sloped sides; and
   a gasket having a receiving slot and at least partially sloped sides, wherein said sloped sides of said gasket have a first portion with a slope of between 10 and 35 degrees and a second portion that is substantially vertical, said gasket being mounted on said first housing with said projecting portion extending into said slot and, said second housing being connected to said first housing with said gasket and said projecting portion being received in said recessed portion wherein said recessed portion sloped sides laterally compress said gasket therebetween and seal said first housing with said second housing.

10. A housing assembly as defined in claim 9, wherein said first portions of said sloped sides of said gasket have a slope of about 25 degrees.

11. A housing assembly comprising:
   a first housing with a projecting seal receiving portion comprising a raised portion of said first housing;
   a second housing with a recessed seal receiving portion, said recessed portion having generally sloped sides; and
   a gasket having a receiving slot and at least partially sloped, convexly curved sides, said gasket being mounted on said first housing with said projecting portion extending into said slot and, said second housing being connected to said first housing with said gasket and said projecting portion being received in said recessed portion wherein said recessed portion sloped sides laterally compress said gasket therebetween and seal said first housing with said second housing.

12. A system of sealing a first member with a second member comprising:
   a gasket having a slot extending thereinto, said gasket having two sides each having a first portion which is sloped and a second portion which is unsloped, the second portions of said sides being essentially parallel;
   means for mounting said gasket to said first member comprising a ridge projection extending along a surface of said first member, said projection being suitably sized and shaped to be received in said slot; and
   means for forming a seal between said first and second members comprising a cavity extending along a surface of said second member and having tapered side walls, said cavity receiving said gasket and said projection therein and laterally compressing said gasket along its entire length between said side walls to form a seal between said side walls and said projection.

13. A system as defined in claim 12 further comprising means to hold said first and second members together.

14. A system as defined in claim 12 wherein said means for forming a seal comprises said gasket, said projection and said cavity being suitably shaped such that said gasket lateral compression is relatively larger than gasket vertical compression.

15. A system as defined in claim 12 wherein said gasket is comprised of silicone.

16. A system as defined in claim 12 wherein said gasket has a substantially flat top section over said cavity which is not substantially compressed between said first and second members.

17. A sealing structure including a gasket, the sealing structure comprising:
a first member with a projecting edge portion; a second member with a recessed channel; a gasket comprising:
a bottom gasket portion having a slot therein and nontapered, essentially parallel outer side walls, said slot extending into the bottom gasket portion at a depth of at least about one-third of the height of the gasket, said slot being substantially the same size and shape as said projecting edge portion such that the gasket can be mounted to said first member with said projecting edge portion being received in said slot; and
a top gasket portion having tapered outer side walls with a relatively small top width and a relatively large bottom width, said top width being smaller than an opening mouth of the second member channel and said top portion bottom width being at least as large as the opening mouth of the second member channel such that as the top gasket portion with said projecting edge portion therein is inserted into the second member channel, lateral forces from compression of the gasket between the projecting edge portion and sides of the channel inwardly deform the sides of the top and bottom gasket portions and seal the sides of the channel with the projecting edge portion.

18. A method of forming a seal between a first housing member and a second housing member comprising the steps of:
providing a gasket with a slot extending into a bottom thereof;
mounting said gasket on said first housing member, said first housing member defining a case having a chamber therein, said first housing member having a projecting edge portion wherein said projecting edge portion is received in said gasket slot; and
mounting said second housing member to said first housing member with said gasket at least partially therebetween, said second housing member defining a lid for said case, said second housing member having a channel with sloped side walls such that said gasket and said projecting edge portion can extend into said channel with said sloped side walls laterally wedging said gasket therebetween to seal said second housing member with said first housing member projecting edge portion, wherein said gasket is a closed loop for forming a sealed chamber in said case and said lid.

19. A method as defined in claim 18 further comprising the step of fixing the first and second housings together by the use of fasteners.

* * * * *